Feb. 9, 1943. B. EDELMAN 2,310,357
ADJUSTABLE CAM-LIKE CONTROL APPARATUS
Filed Jan. 13, 1940 2 Sheets-Sheet 2
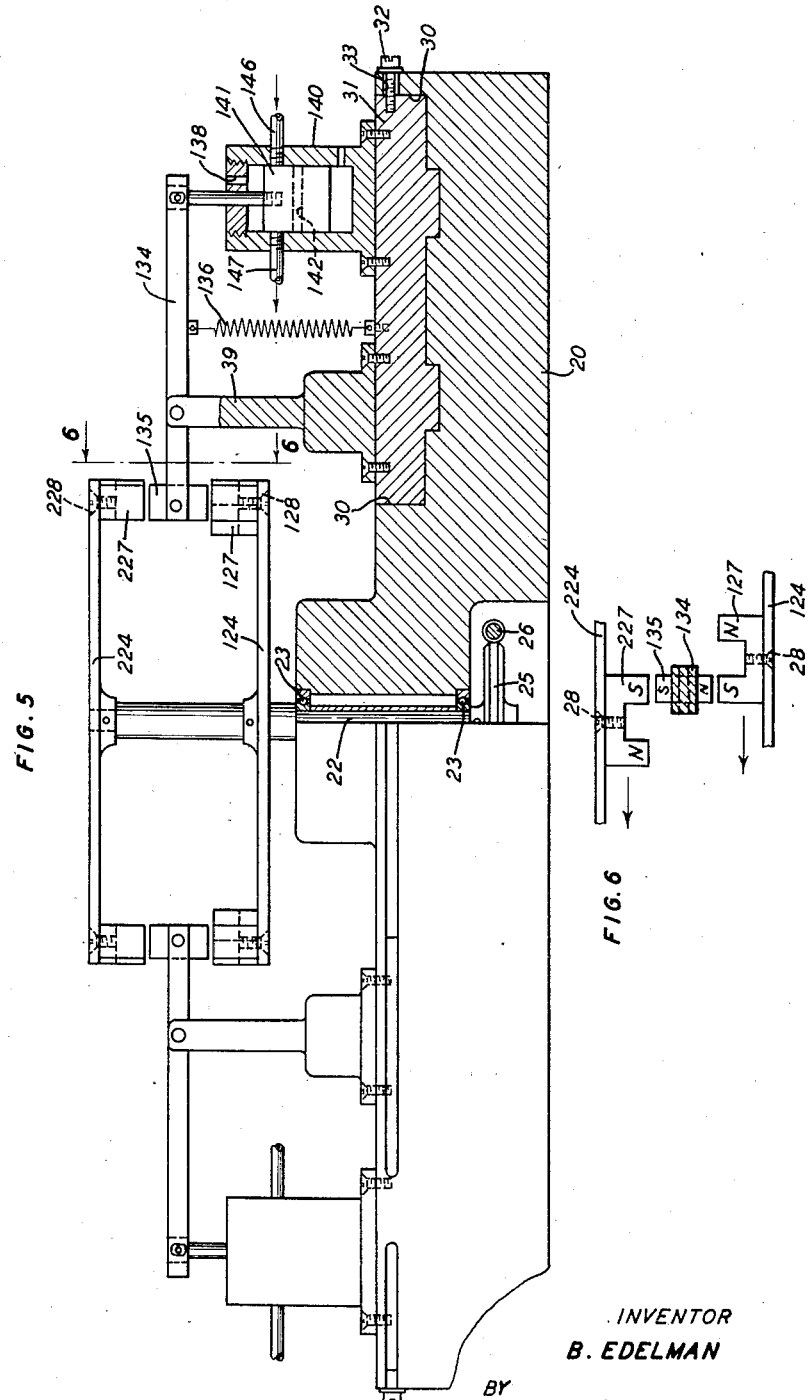
INVENTOR
B. EDELMAN
BY
E. R. Nowlan
ATTORNEY Patented Feb. 9, 1943

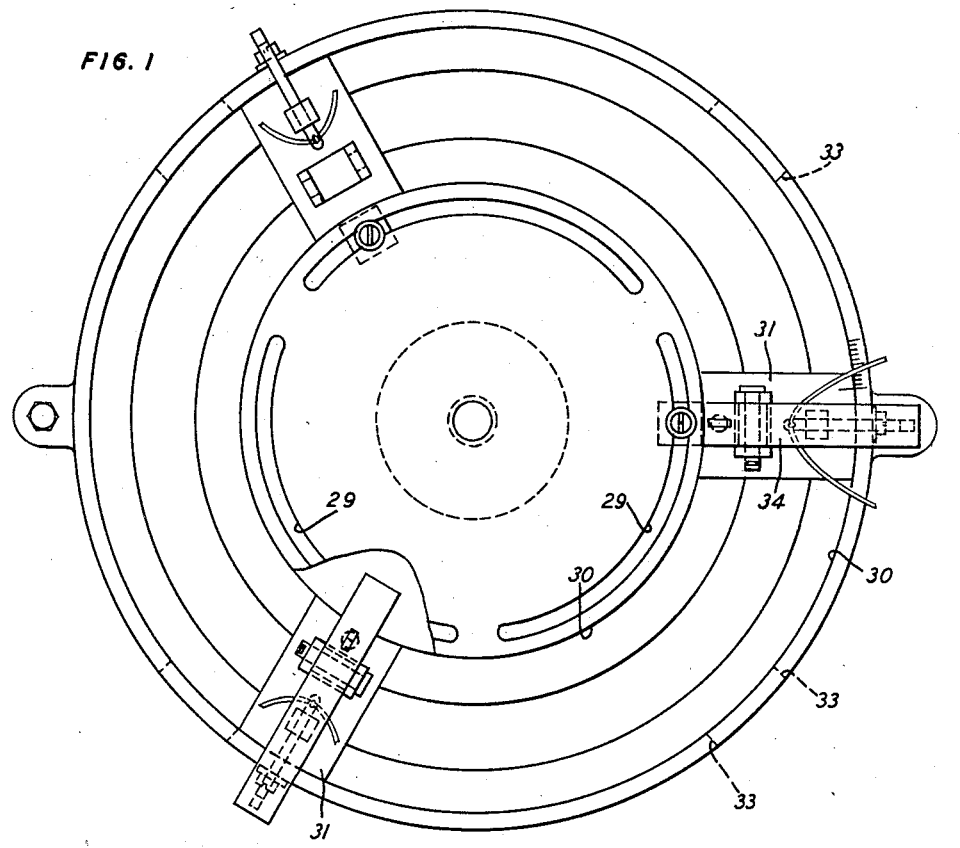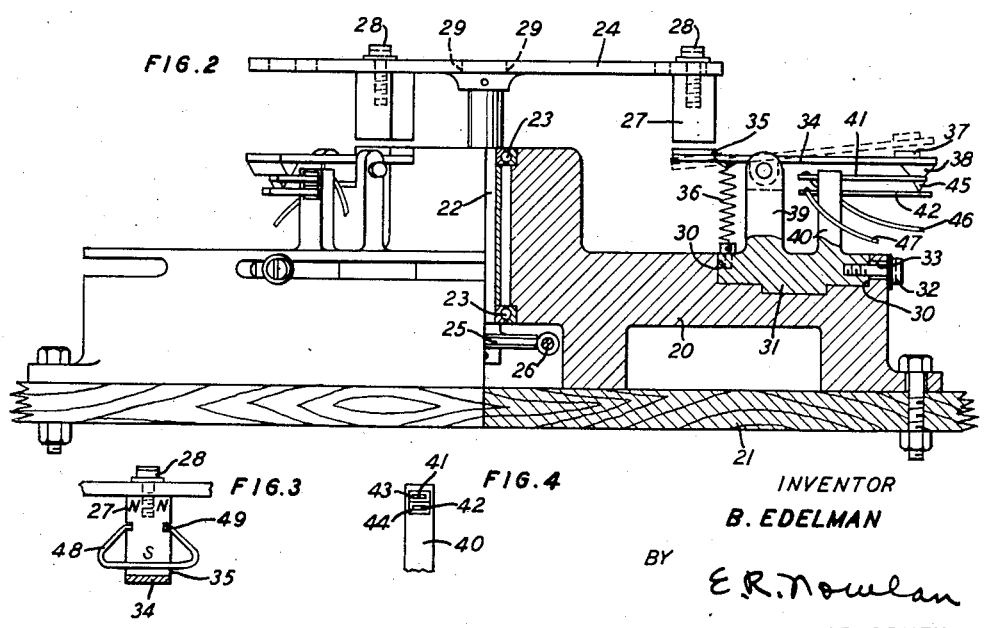

2,310,357

UNITED STATES PATENT OFFICE 2,310,357

ADJUSTABLE CAMLIKE CONTROL APPARATUS

Beril Edelman, Brooklyn, N. Y., assignor to Western Electric Company, Incorporated, New York, N. Y., a corporation of New York Application January 13, 1940, Serial No. 313,703

2 Claims. (Cl. 74—1)

This invention relates to an adjustable camlike control apparatus, and more particularly to an apparatus functionally equivalent to a cam device for effecting a cyclic sequence of actuations of other means and possessing an inherent capacity for adjustability of the time intervals between consecutive actuations of the sequence without any need for interchangeability of parts or of interruption of operation for adjustment.

There is an infinite possible variety of apparatus and machines, both for experimental and research uses and for manufacturing procedures, which comprise a plurality of separate, individually functioning devices, whose consecutive actuation at predetermined times or intervals forms a cycle of operations constituting the characteristic function or operation of the apparatus or machine as a whole. Each of the individual devices comprised in the machine may be power actuated by itself, for example, mechanically by being engaged with or disengaged from a common moving element, e. g. a main power shaft, or hydraulically or pneumatically by having fluid power supplied thereto or cut off therefrom by a valve or the like, or electrically under control of some familiar type of relay or switch means. The proper actuation, at the predetermined times or intervals of a cycle, of the control devices, clutches, valves, switches or whatever is frequently effected by a moving mechanical cam device, in which a reciprocating or rotating mechanical member having a suitable cam face or track, acts to reciprocate actuating members, levers, slides, crank pins, or the like which in turn actuate the control devices. Such mechanical control apparatus, depending upon a mechanical cam, are eminently positive, reliable and accurate. However, they suffer from one, sometimes important drawback, which is inherent in the nature of a mechanical cam, and which is that a cam member, once formed, is unalterable. There is no way in which the time intervals of a cyclic sequence controlled by a cam can be modified or adjusted at the cam, no matter how slightly, except by substituting another cam for the one in use. This expedient is objectionable, chiefly because of the interruption of operation and the expense of creating a plurality of cams, and also because, even then, the adjustability is only step by step and not continuous.

An object of the present invention is to provide a device equivalent to a mechanical cam in function, reliability and accuracy of operation and also having inherent capability of continuous adjustability of the time intervals between the individual acts of actuation comprised in a cycle of operation of the device.

With the above and other objects in view, the invention may be embodied in an apparatus comprising a movable support and one or more magnetic actuating members thereon, in combination with a plurality of magnetically actuable members positioned adjacent to the path of the actuating members and each actuable thereby, each actuable member being operatively associated with an individual control device (lever, valve, switch or the like), each actuating member being adjustable on the support, and each actuable member with its associated control device being adjustable as a unit along the path of the actuating members.

Other objects and features of the invention will appear from the following detailed description of several embodiments thereof taken in connection with the accompanying drawings in which the same reference numerals are applied to identical parts in the several figures, and in which Fig. 1 is a plan view partly in section and partly broken away of a device constructed in accordance with the invention;

Fig. 2 is a view thereof in elevation and partly in section;

Fig. 3 is a detached elevation of one of the actuating magnets showing an auxiliary inhibiting shoe in position;

Fig. 4 is an elevation of the radially inner side of one of the supports on one of the adjustable carriages;

Fig. 5 is a view similar to Fig. 2 of a modified form; and

Fig. 6 is a partial radially inward elevation on the line 6—6 of Fig. 5.

In the embodiment of the invention disclosed in Figs. 1, 2, 3 and 4, a base member 20 of aluminum, brass, wood, molded plastic or other suitable and preferably non-magnetic material rests on or is secured to a table or bench 21. A vertical shaft 22 is journalled in the base, as by bearings 23, and carries a horizontal disk 24 at the top, of suitably preferably non-magnetic material. At the bottom of the shaft 22 is a gear 25 driven by a worm 26 which in turn is driven by any suitable means not shown.

A plurality (here three) of actuating magnets 27 is supported on the under side of the disk 24 at intervals around its periphery and equidistant from its center. Each magnet 27 is secured to the disk, e. g. by screws 28 passing through arcuate slots 29 in the disk, to be adjustable in angular position relatively to its neighboring magnets.

An annular groove or track 30 is formed in the upper side of the base 20 concentric with the shaft 22 and disk 24. A plurality (here four) of carriages 31 rides slidably in the groove, and may be locked in any desired location in the groove by means of jam screws 32 passing through slots 33 formed in the vertical outer wall of the groove. Each of the carriages 31, as here shown, carries a horizontal lever 34 pivoted on a suitable support 39 to be radial to the axis of the shaft 22 and disk 24, and to have its inner end extend under the path of the magnets 27. On the upper side of the inner end is secured a block or armature 35 of magnetic material, preferably soft iron. A tension spring 36 is secured at one end to the under side of the inner end of the lever 34 and at the other end to the body of the carriage 31. A counterweight 37 is secured on the upper side of the outer end of the lever and a contact block 38, preferably of non-metallic insulating material, is mounted on the under side of the outer end, of the lever 34. A second support 40 on the carriage body has two metallic spring contacts 41 and 42 mounted therein in insulating sleeves or blocks 43 and 44. One of the contact springs (here the upper one 41) is provided with a metallic contact member 45 to engage the other spring (here 42) when the spring bearing it is flexed. These several elements are so proportioned and arranged, as shown, that the springs 41 and 42 and the lever 34 are always vertically aligned, and so that when the block 35 is under one of the magnets 27, the lever and spring contacts stand as shown in full lines in Fig. 2, whereas when the block 35 is not influenced by any of the magnets 27, the lever 34 takes the position shown in dotted lines and the spring 41 rises to bring the member 45 out of contact with the spring 42. Leads 46 and 47 attached to the contact springs 41 and 42 serve to connect these into an electrical circuit to energize or control any desired apparatus or component operating unit of an apparatus.

All parts of the device described not otherwise particularized will be preferably of non-magnetic metal or other suitable material such as wood, glass, ebonite, plastics or the like. The magnets 27 will be preferably of high retentivity magnetic metal such, for example, as the alloy commercially known as "Alnico" and consisting of about 12% aluminum, 20% nickel, 5% cobalt and the balance iron. A magnet of such material can be magnetically saturated to a high degree and will retain its magnetic power for a long time.

It will be observed that, as described, the apparatus comprises three magnetic actuating members, the three magnets 27, and four responsive units. Each responsive unit consists of one carriage 31 together with a lever 34 and contact springs 41 and 42 mounted thereon. As shown, the three magnets are spaced equally around the peripheral portion of their supporting disk 24 and the four units are spaced equally around the annular track or groove 30. Hence in each revolution of the disk 24, the four levers 34 will be actuated three times each at equal intervals of time and in regular sequence. If for any reason it be desired to alter the intervals between the successive actuations of the four units by any one magnet, the carriages 31 will be shifted correspondingly along in the carriage track 30. Also if it be desired to alter the time spacing of the actuations of any one unit by the successive magnets, the latter will be correspondingly shifted along the peripheral part of the disk. Obviously one or two of the magnets 27 may be entirely removed, or more such magnets may be secured in the slots 29. Thus a practically infinite variety of combinations of a fixed number of actuations in a cycle, varying as to the division between them of the total time of a cycle of actuations is possible by merely adjusting the magnets 27 and carriages 31; while the number of actuations in a cycle is changed by adding or subtracting carriages.

If it be desired for any reason to inhibit merely temporarily the effect of any one of the magnets, this can be easily accomplished by placing on that magnet the auxiliary device 48 shown only in Fig. 3. This is a spring clip of brass, bronze, Bakelite, ebonite, or the like non-magnetic material formed as shown to extend under the bottom end of the magnet and to have its ends snap into slots 49 in the magnet to hold it in place. It extends laterally across the bottom end of the magnet circumferentially of the disk, and is of sufficient thickness so that the armature 35 cannot be drawn up far enough by the magnet passing over it to make contact between springs 41 and 42.

In the modified form shown in Figs. 5 and 6, two parallel horizontal disks 124 and 224 are mounted on the shaft 22 instead of the single disk 24. U-shaped magnets 127 and 227, respectively, are mounted as before by screws 128 and 228 in slots 129 and 229 in the disks on the upper face of the lower disk 124 and on the lower face of the upper disk 224. These are ordinarily mounted to stand over each other as shown in Fig. 6, with a pole of the upper magnet over a like pole of the lower magnet, and each with its other pole extending away from the other pole of the other magnet.

The soft iron armature 35 on the lever 34 is replaced by a short permanent bar magnet 135 of "Alnico" or the like on the lever 134 which is connected at its other end to the piston slide 141 of a pneumatic valve having a cylinder 140 in which the piston 141 moves, a compressed air inlet 146 and a compressed air outlet 147, and also breathing holes 138.

If the shaft 22 be rotating clockwise as seen from above, the magnets 127 and 227 will move together past the armatures 135 in the direction shown by the arrows in Fig. 6. The N-pole of 227, in Fig. 6, will be the first to influence the armature 135, tending to draw it up. A moment later, the armature 135 is driven down by the double effect of the S-pole of 227 and the S-pole of 127, thus pulling up the piston slide 141 in the cylinder 140 until the connector bore 142 in the slide is aligned with the compressed air inlet 146 and outlet 147, allowing the air to pass to perform whatever function it is to control. A moment later the armature is again driven up by the N-pole of 127, and the air flow from 146 to 147 is cut off. The leading N-pole of 227 and the trailing N-pole of 127 thus help to assure the quick and accurate opening and closing of the valve. The closing may be further boosted, if desired, by a spring 136, or by omitting or plugging one or the other or both of the breathing holes 138 to employ the compression and rarefaction of the air in the two ends of the cylinder.

In each of the two forms disclosed, the actuating magnets are rotated and the actuable control units operated by them are stationary. This is the simplest manner in which to disclose the principles of the invention. It is, however, also possible to maintain the actuating magnets stationary while the actuable units rotate. A structure of this kind is disclosed in detail in copending application Serial No. 313,702, filed of even date with this by the same inventor, to which reference may be had if desired.

The magnetic members herein disclosed, the actuating magnets and the armature members moved thereby are shown as permanent magnets. They may also, of course, be electromagnetic in form, i. e. magnetic cores energized by electrical coils, or solenoids. It is believed that the modifications required for such construction are too simple and obvious to require detailed description and disclosure here, and hence such are not shown. However, in the appended claims the word "magnetic" and "magnetically" are to be taken to include in their meanings permanent magnets, electromagnets and solenoids.

The phrase "power control device" is intended to include any ordinary and well known device in which motion of a member actuates means to start or stop a flow of power, such as an electric switch, a fluid controlling valve, a clutch, or the like.

It is also to be noted that in Fig. 2, the parts are so proportioned that the electrical contacts are closed before the armature can rise far enough to rub against the magnet lifting it and prevent contact of the armature with the magnets. Also in Fig. 5, the piston is stopped by the cylinder top a little before the armature being drawn down comes into contact with the actuating magnet. Thus there is never any frictional contact between the quasi cam embodied in the rotating disk and its magnets on the one hand and the quasi cam follower embodied in each armature and lever.

The embodiments disclosed are illustrative and may be variously modified and departed from without departing from the spirit and scope of the invention as pointed out in and limited by the appended claims.

What is claimed is:

1. Apparatus to effect cyclically repeated initiation of a plurality of operations and adapted to provide adjustability of the time intervals between the initiations of a cycle, the said apparatus comprising a base member, a support member rotatable continuously in one direction relatively thereto, a cyclic plurality of mutually independent operation initiating means mounted on one of the said members and each magnetically actuable without mechanical contact with any actuating means to initiate a specific operation of the cycle, a cyclic plurality of mutually independent magnetic actuating means mounted on the other of said members to be brought successively and cyclically by relative rotation of the members into actuating relation with each of the actuable operation initiating means in turn, and means to render each actuable means adjustable in position on the member on which the same is mounted as to spacing relative to adjacent other units of the plurality of actuable means.

2. Apparatus to effect cyclically repeated initiation of a plurality of operations and adapted to provide adjustability of the time intervals between the initiations of a cycle, the said apparatus comprising a base member, a support member rotatable continuously in one direction relatively thereto, a cyclic plurality of mutually independent operation initiating means mounted on one of the said members and each magnetically actuable without mechanical contact with any actuating means to initiate a specific operation of the cycle, a cyclic plurality of mutually independent magnetic actuating means mounted on the other of said members to be brought successively and cyclically by relative rotation of the members into actuating relation with each of the actuable operation initiating means in turn, means to render each actuable means adjustable in position on the member on which the same is mounted as to spacing relative to adjacent other units of the plurality of actuable means, and means to render each actuating means adjustable in position on the member on which the same is mounted as to spacing relative to adjacent other units of the plurality of actuating means.

BERIL EDELMAN.